(12) United States Patent
Francis, Jr.

(10) Patent No.: US 8,380,652 B1
(45) Date of Patent: Feb. 19, 2013

(54) METHODS AND SYSTEMS FOR AUTONOMOUS ROBOTIC DECISION MAKING

(75) Inventor: Anthony G. Francis, Jr., San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/464,693

(22) Filed: May 4, 2012

Related U.S. Application Data

(60) Provisional application No. 61/483,295, filed on May 6, 2011, provisional application No. 61/591,616, filed on Jan. 27, 2012.

(51) Int. Cl.
*G06F 17/00* (2006.01)
*G06N 5/02* (2006.01)

(52) U.S. Cl. .......................................................... 706/48
(58) Field of Classification Search ........................ None
See application file for complete search history.

(56) References Cited

U.S. PATENT DOCUMENTS

| | | | |
|---|---|---|---|
| 5,636,328 A | 6/1997 | Kautz et al. | |
| 5,737,500 A | 4/1998 | Seraji et al. | |
| 6,865,437 B1 * | 3/2005 | Babikian et al. | 700/121 |
| 7,962,490 B1 | 6/2011 | Kariv | |
| 2007/0013336 A1 | 1/2007 | Nowlin et al. | |

OTHER PUBLICATIONS

'Human aware task planning for mobile robotr': Cirillo, 2009, Proc of the Int Conf on Advanced Robitics.*
'Toward human-aware robot task planning': Alami, 2006, American Assoc for AI.*
'Task planning for human robot interaction': ALami, 2005, Joint sOc-EUSAI, pp. 81-85.*
Cirillo, M. et al., Human-Aware Task Planning for Mobile Robots, International Conference on Advanced Robotics (ICAR), Munich, Germany, Jun. 2009.

* cited by examiner

*Primary Examiner* — Kakali Chaki
*Assistant Examiner* — Peter Coughlan
(74) *Attorney, Agent, or Firm* — McDonnell Boehnen Hulbert & Berghoff LLP

(57) ABSTRACT

Methods and systems for robotic determination of a response to conflicting commands are provided. The robot may evaluate scenarios using variables related to the contextual/situational data for event outcomes from which the robot can determine which of two or more actions to take, as by prioritizing the actions in order of importance.

19 Claims, 7 Drawing Sheets

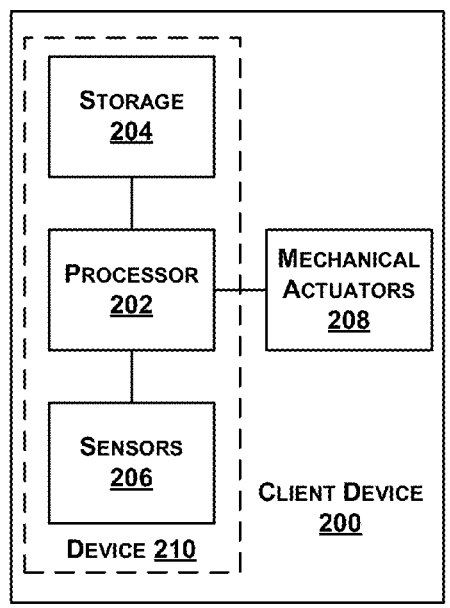
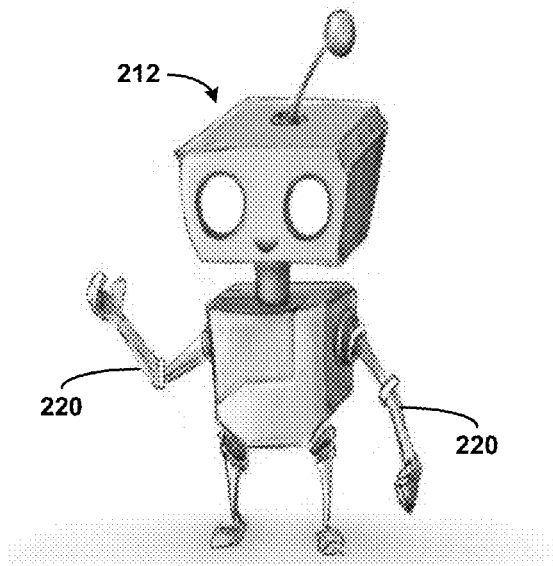
FIGURE 2A
FIGURE 2B
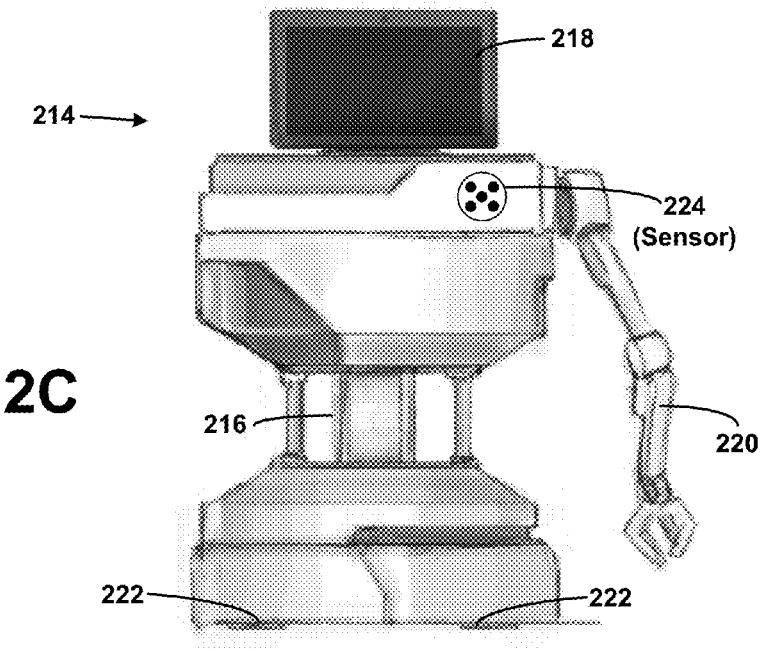
FIGURE 2C

METHODS AND SYSTEMS FOR AUTONOMOUS ROBOTIC DECISION MAKING

CROSS-REFERENCE TO RELATED APPLICATIONS

The present disclosure claims priority to U.S. Patent Application No. 61/483,295 filed on May 6, 2011 and to U.S. Patent Application No. 61/591,616 filed on Jan. 27, 2012, the entire contents of each of which are herein incorporated by reference.

BACKGROUND

Cloud computing refers to provision of computational resources via a computer network. In a traditional model of computing, both data and software are fully contained on a user's computer. In cloud computing, however, the user's computer may contain relatively little software or data (perhaps a minimal operating system and web browser, for example), and may serve as a display terminal for processes occurring on a network of computers. A common shorthand provided for a cloud computing service or system (or even an aggregation of existing cloud services) is "the cloud."

Cloud computing has been referred to as "client-server computing", however, there may be distinctions between general cloud computing and client-server computing. For example, client-server computing may include a distributed application structure that partitions tasks or workloads between providers of a resource or service (e.g., servers), and service requesters (e.g., clients). Client-server computing generally involves a one-to-one relationship between the server and the client, whereas cloud computing includes generic services that can be accessed by generic clients (e.g., a one-to-one relationship or connection may not be required). Thus, cloud computing generally includes client-server computing, and additional services and functionality.

Cloud computing may free users from certain hardware and software installation and maintenance tasks through use of simpler hardware on the user's computer that accesses a vast network of computing resources (e.g., processors, hard drives, etc.). Sharing of resources may reduce cost to individuals. Thus, any computer connected to the cloud may be connected to the same pool of computing power, applications, and files. Users can store and access personal files such as music, pictures, videos, and bookmarks or play games or use productivity applications on a remote server rather than physically carrying around a storage medium, such as a DVD or thumb drive.

In one example, a user may open a browser and connect to a host of web servers that run user interface software that collect commands from the user and interpret the commands into commands on the servers. The servers may handle the computing, and can either store or retrieve information from database servers or file servers and display an updated page to the user. Through "cloud computing," data across multiple servers can be synchronized around the world allowing for collaborative work on one file or project, from multiple users around the world, for example.

SUMMARY

In one example, a method is provided comprising receiving, at the robotic device, a plurality of commands, and each command of the plurality of commands is associated with a time of execution. The method may also comprise determining, for each of the plurality of commands, at least one constraint of a plurality of constraints for the robotic device. The method may further comprise for each command, determining the time of execution based on a satisfaction of the at least one constraint of the plurality of constraints associated with the respective command. The method may also comprise determining a prioritization of execution of the plurality of commands based on the plurality of times of execution and based on an environment where the respective commands are to be executed, and executing, by the robotic device, at least one command of the plurality of commands based on the prioritization of execution.

In another example, a computer readable medium having stored therein instructions executable by a robotic device that includes at least one sensory device to cause the robotic device to perform functions is provided. The functions may comprise receiving, at the robotic device, a plurality of commands, and each command of the plurality of commands is associated with a time of execution. The functions may also comprise determining, for each of the plurality of commands, at least one constraint of a plurality of constraints for the robotic device. The functions may further comprises for each command, determining the time of execution based on a satisfaction of the at least one constraint of the plurality of constraints associated with the respective command, and executing, by the robotic device, at least one command of the plurality of commands based on the plurality of times of execution.

In another example, a robotic device is provided that comprises one or more processors, at least one sensor coupled to the one or more processors and configured to capture data about an environment in a vicinity of the at least one sensor, and memory including instructions stored thereon executable by the one or more processors to perform functions. The functions may comprise receiving, at the robotic device, a plurality of commands, wherein each command of the plurality of commands is associated with a time of execution. The functions may also comprise determining, for each of the plurality of commands, at least one constraint of a plurality of constraints for the robotic device. The functions may further comprise for each command, determining the time of execution based on a satisfaction of the at least one constraint of the plurality of constraints associated with the respective command, and executing, by the robotic device, at least one command of the plurality of commands based on the plurality of times of execution.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the Figures and the following Detailed Description.

BRIEF DESCRIPTION OF THE FIGURES

FIG. 2A illustrates an example client device.
FIG. 2B illustrates a graphical example of a robot.
FIG. 2C illustrates another example of a robot.

DETAILED DESCRIPTION

Figure 1:
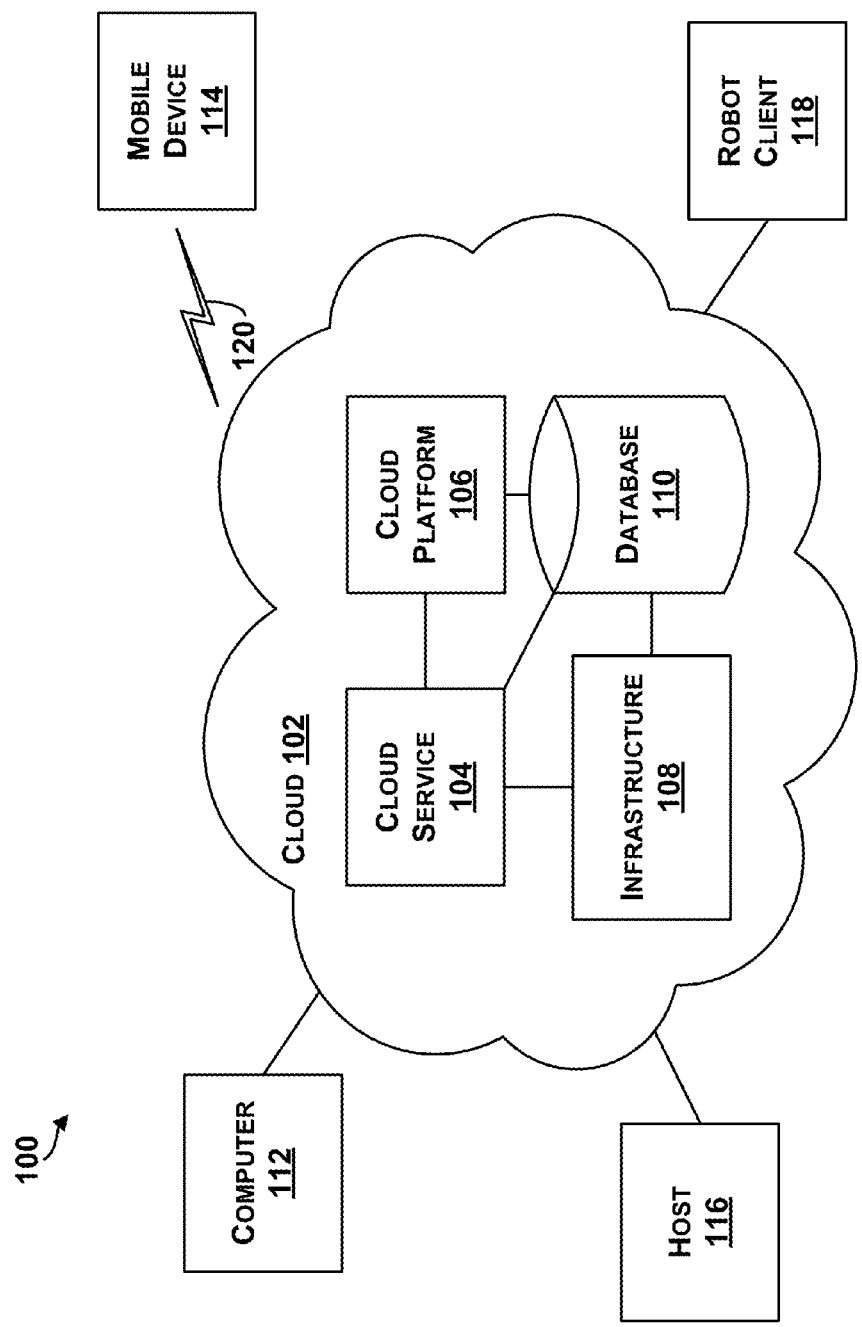
FIG. 1 is an example system for cloud-based computing.

In the following detailed description, reference is made to the accompanying Figures, which form a part hereof. In the Figures, similar symbols typically identify similar components, unless context dictates otherwise. The illustrative embodiments described in the detailed description, Figures, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure includes, inter alia, methods and systems for robot and user interaction over the cloud. Within examples, cloud-based computing generally refers to networked computer architectures in which application execution and storage may be divided, to some extent, between client and server devices. A robot may be any device that has a computing ability and interacts with its surroundings with an actuation capability (e.g., electromechanical capabilities). A client device may be configured as a robot including various sensors and devices in the forms of modules, and different modules may be added or removed from robot depending on requirements. In some examples, a robot may be configured to receive a second device, such as mobile phone, that may be configured to function as an accessory or a "brain" of the robot.

In examples described herein, a robot may interact with the cloud to perform any number of actions, such as to share information with other cloud computing devices. Within examples, a robot may interact with a user in a manner that is based upon many types of received information. A robot may access a user device to determine or identify information about a user or related to the user, and the robot may be configured to tailor a method of interaction with the user based on the identified information. A robot may further receive data associated with the user to identify the user, such as using speech or face recognition. The robot may provide a personalized interaction or response to the user based on the determined information of the user.

In some examples, a robot may be asked (commanded) to perform one or more functions, each of which may have certain constraints associated with that function. Commands may therefore conflict, as in the context of the constraints. Based upon an existing hierarchical ontology, drawn from memory or from a local or cloud based informational resource, the robot may be able to alter the order of lower-level tasks required to perform a command to stay within the constraints. But if a first command function, e.g., an output function such as a task, cannot be completed within one or more constraints, which may be imposed by another or second function which the robot is commanded to do at the same time (or time frame) with the first function, the robot may then determine, or prioritize, which constraint(s) to relax; or put another way, determine which of the conflicting commands to suspend in favor of executing another command. That suspension of one command may be for a period of time or indefinitely. The robot may reevaluate a suspended command over time, for a determination of whether the conflict no longer exists, or that the suspended command should then be executed with suspension of further execution of the other command, based upon sensory data obtained over time.

As an example, if the robot is asked to "clean the floor" as a first command, and to "stay quiet" when guests are in the vicinity of the robot as a second command, then the robot may temporarily stop cleaning the floor in the presence of guests. However, if the robot senses that the guests are lingering too long in its vicinity, then the robot may determine that it is now more important to "clean the floor" rather than "stay quiet", and resume cleaning the floor.

In some examples, a robot may be capable of systematically processing commands, as from a user, and autonomously responding to situations where the commands are not prioritized, or more particularly, where the commands are potentially in conflict. Example systems and methods may obtain relational data from an informational resource such as the cloud, for use in processing or determining which restraints associated with conflicting commands to relax in order to execute at least one of the command functions. The relational data may comprise previously established classes, hierarchies or rules of lower-level stages or steps involved in a higher-level task, and responses to those stages or steps.

The cloud processing may further include filtering to refine the relational data in the situational/contextual environment sensed by the robot, and the use of a higher level of rules, such as weighting or harm-benefit analyses, from which the robot then performs reasoning, or determinations, regarding a command prioritization of the conflicting commands. The robot may have the sensory ability to update the command prioritization dynamically, taking into consideration changed aspects of the environment where the commands are to be executed. Furthermore, the robot may have the ability to extrapolate to likely conclusions which may result as a consequence of selecting one command over another, and over time to reevaluate the choice of commands. That extrapolation may include determining event outcomes as by running simulations with changing variables, which may be performed in the cloud and results of the simulations may be provided to the robot. The robot may then factor an action based upon a chosen event outcome for a desired consequence.

1. Cloud Computing Architecture

Referring now to the Figures, FIG. 1 is an example system 100 for cloud-based computing. Cloud-based computing generally refers to networked computer architectures in which application execution and storage may be divided, to some extent, between client and server devices. A "cloud" may refer to a service or group of services accessible over a network (e.g., Internet) by client and server devices, for example.

In one example, any computer connected to the cloud may be connected to the same pool of computing power, applications, and files. Thus, cloud computing enables a shared pool of configurable computing resources (e.g., networks, servers, storage, applications, and services) that can be provisioned and released with minimal management effort or service provider interaction. Users can store and access personal files such as music, pictures, videos, and bookmarks or play games or use productivity applications on a remote server rather than physically carrying around a storage medium.

As an example, in contrast to a predominately client-based or server-based application, a cloud-based application may store copies of data and/or executable program logic at remote server devices, while allowing client devices to download at least some of this data and program logic as needed for execution at the client devices. In some examples, downloaded data and program logic can be tailored to capabilities of specific client devices (e.g., a personal computer, tablet, or mobile phone, or robot) accessing the cloud based application. In addition, dividing application execution and storage between the client and server devices allows more processing to be performed by the server devices taking advantage of server devices processing power and capability, for example.

Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

In FIG. 1, a cloud 102 includes a cloud service 104, a cloud platform 106, a cloud infrastructure 108, and a database 110. The cloud 102 may include more of fewer components, and each of the cloud service 104, the cloud platform 106, the cloud infrastructure 108, and the database 110 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1. Delivery of cloud computing may involve multiple cloud components communicating with each other over application programming interfaces, such as web services and three-tier architectures, for example.

The cloud 102 may represent a networked computer architecture, and in one example, the cloud service 104 represents a queue for handling requests from client devices. The cloud platform 106 may include a frontend of the cloud and may be coupled to the cloud service 104 to perform functions to interact with client devices. The cloud platform 106 may include applications used to access the cloud 102 via a user interface, such as a web browser. The cloud infrastructure 108 may include service application of billing components of the cloud 102, and thus, may interact with the cloud service 104. The database 110 may represent storage capabilities by the cloud 102, and thus, may be accessed by any of the cloud service 104, the cloud platform 106, and/or the infrastructure 108.

The example system 100 includes a number of client devices coupled to or configured to be capable of communicating with components of the cloud 102. For example, a computer 112, a mobile device 114, a host 116, and a robot client 118 are shown coupled to the cloud 102. Of course, more or fewer client devices may be coupled to the cloud 102. In addition, different types of client devices may be coupled to the cloud 102. For example, any of the client devices may generally comprise a display system, memory, and a processor.

The computer 112 may be any type of computing device (e.g., PC, laptop computer), and the mobile device 114 may be any type of mobile computing device (e.g., laptop, mobile telephone, cellular telephone).

The host 116 may be any type of computing device or transmitter including a laptop computer, a mobile telephone that is configured to transmit data to the cloud 102.

The robot client 118 may comprise any computing device that has connection abilities to the cloud 102 and that has an actuation capability (e.g., electromechanical capabilities). A robot may further be a combination of computing devices. In some examples, the robot 118 may collect data and upload the data to the cloud 102. The cloud 102 may be configured to perform calculations or analysis on the data and return processed data to the robot client 118. In some examples, as shown in FIG. 1, the cloud 102 may include a computer that is not co-located with the robot client 118. In other examples, the robot client 118 may send data to a second client (e.g., computer 112) for processing.

Any of the client devices may include additional components. For example, the robot client 118 may include one or more sensors, such as a gyroscope or an accelerometer to measure movement of the robot client 118. Other sensors may further include any of Global Positioning System (GPS) receivers, infrared sensors, optical sensors (still image or motion picture), biosensors, Radio Frequency identification (RFID) systems, RADAR wireless sensors, haptic arrays and other touch sensors, and/or compasses, among others, for example.

In addition, any of the client devices may include an integrated user-interface (UI) that allows a user to interact with the device. For example, the robot client 118 may include various buttons and/or a touchscreen interface that allow a user to provide input. As another example, the robot client device 118 may include a microphone configured to receive voice commands from a user. Furthermore, the robot client 118 may include one or more interfaces that allow various types of user-interface devices to be connected to the robot client 118.

In FIG. 1, communication links between client devices and the cloud 102 may include wired connections, such as a serial or parallel bus. Communication links may also be wireless links, such as link 120, which may include Bluetooth, IEEE 802.11 (IEEE 802.11 may refer to IEEE 802.11-2007, IEEE 802.11n-2009, or any other IEEE 802.11 revision), or other wireless based communication links.

In other examples, the system 100 may include access points through which the client devices may communicate with the cloud 102. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the client devices may include a wired or wireless network interface through which the client devices can connect to the cloud 102 (or access points). As an example, the client devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

2. Example Robot Architecture

FIG. 2A illustrates an example client device 200. In one example, the client device 200 is configured as a robot. In some examples, a robot may contain computer hardware, such as a processor 202, memory or storage 204, and sensors 206. For example, a robot controller (e.g., processor 202, computing system, sensors 206) may all be custom-designed for a specific robot. The robot may have a link by which the link can access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robot and storing program instructions. The processor 202 may be coupled to the storage 204 and may be configured to control the robot based on the program instructions. The processor 202 may also be able to interpret data from the various sensors 206 on the robot, as discussed above.

The client device 200 may also have components or devices that allow the client device 200 to interact with its environment. For example, the client device 200 may have mechanical actuators 208, such as motors, wheels 222, movable arms 220 that enable the client device 200 to move or interact with the environment.

In some examples, various sensors and devices on the client device 200 may be modules. Different modules may be added or removed from a client device 200 depending on requirements. For example, in a low power situation, a robot may have fewer modules to reduce power usages. However, additional sensors may be added as needed. To increase an amount of data a robot may be able to collect, additional sensors may be added, for example.

In some examples, the client device 200 may be configured to receive a device, such as device 210, that includes the processor 202, the storage 204, and the sensors 206. For example, the client device 200 may be a robot that has a number of mechanical actuators (e.g., a movable base), and the robot may be configured to receive a mobile telephone to function as the "brains" or control components of the robot. The device 210 may be considered a module of the robot. The device 210 may be physically attached to the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the client device 200 may be coupled to a mobile or cellular telephone to provide additional sensing capabilities. The cellular phone may not be physically attached to the robot, but may be coupled to the robot wirelessly. For example, a low cost robot may omit a direct connection to the Internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the client device 200 may include mechanical robot features, and may be configured to receive the device 210 (e.g., a mobile phone), which can provide additional peripheral components to the device 200, such as any of an accelerometer, gyroscope, compass, GPS, camera, WiFi connection, a touch screen, that are included within the device 210.

FIG. 2B illustrates a graphical example of a robot 212. In FIG. 2B, the robot 212 is shown as a mechanical form of a humanoid including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

The mountable device 210 may further be configured to maximize runtime usage of the robot 212 (e.g., if the robot 212 could learn what happens to cause the user to turn the toy off or set the toy down, the device 210 may be configured to perform functions to counteract such occurrences).

FIG. 2C illustrates another example of a robot 214. The robot 214 includes a computing device 216, and a mechanical actuator 220. In this example, the computing device 216 may be a laptop computer or the equivalent thereof. Here, the robot has been provided with a video display or monitor 218, which may be coupled to sensors 224. The video monitor 218 could, as here, be used to project an image relating to a personality then being adopted by the robot 214. The sensors 224 may include a camera, infrared projectors, and other motion sensing or vision sensing elements. The robot 214 may include a base, wheels 222, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management), to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework).

3. Robot and Cloud Interaction

Figure 3:
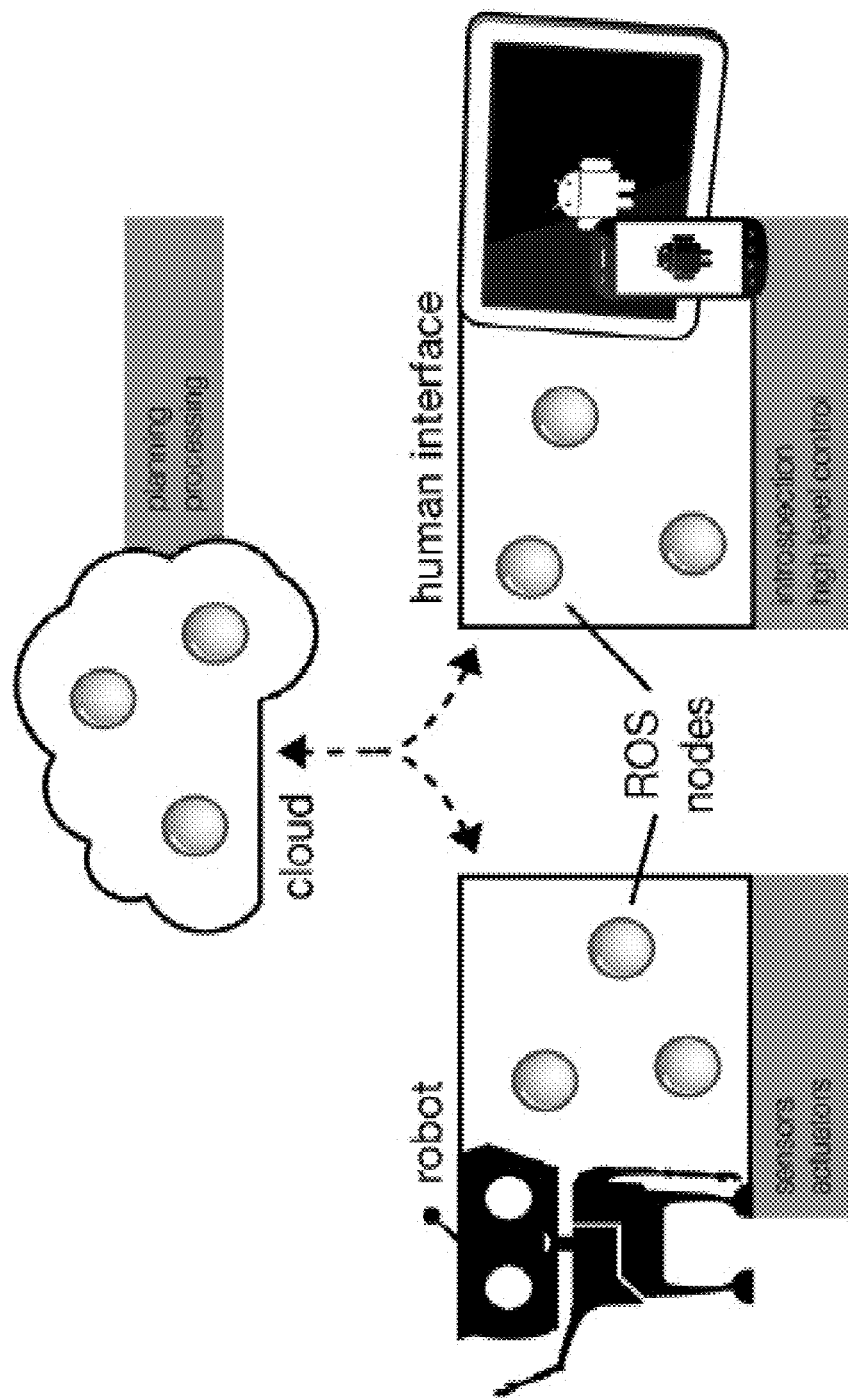
FIG. 3 illustrates an example of a conceptual robot-cloud interaction.

FIG. 3 illustrates an example of a robot-cloud interaction. A robot, such as a robot described and illustrated in FIGS. 2A-C, may connect to a network of computers (e.g., the cloud), and may request data or processing to be performed by the cloud. In one example, the robot may include a number of sensors and mechanical actuators that may generally provide motor control for the robot. The sensor inputs to the robot, such as camera feeds, vision sensors, touch sensors and other clothing probes, may be provided to the cloud, which can process these outputs to the cloud to enable the robot to extract information and perform functions. The cloud may process a camera feed, for example, to determine a location of a robot, perform object recognition as for an article of clothing, or to indicate a navigation pathway for the robot.

FIG. 3 generally illustrates motor controllers in which each module may conceptually represent a computer or node on the cloud that performs processing using motor controller inputs or data from the robot. FIG. 3 also generally illustrates sensors in which each module may conceptually represent a computer or node on the cloud that performs processing using sensor inputs or data from the robot. FIG. 3 further generally illustrates applications in which each module may conceptually represent a computer or node on the cloud that performs specific functions of a number of applications, e.g., navigation application, mapping application. In addition, FIG. 3 further generally illustrates planning in which each module may conceptually represent a computer or node on the cloud that performs processing for the robot, such as general planning or computing processing.

As shown, any of the modules may be interconnected, and/or may communicate to receive data or instructions from each other so as to provide a specific output or functionality for the robot.

In one example, the robot may send sensory data of object attributes to a cloud for data processing, and in another example the robot may receive data back from the cloud based upon processing of that sensory data. The data received from the cloud may be in many different forms. The received data may be a processed form of data the robot sent to the cloud. The received data may also come from sources other than the robot. For example, the cloud may have access to other sensors, other robots, and the Internet.

Figure 4:
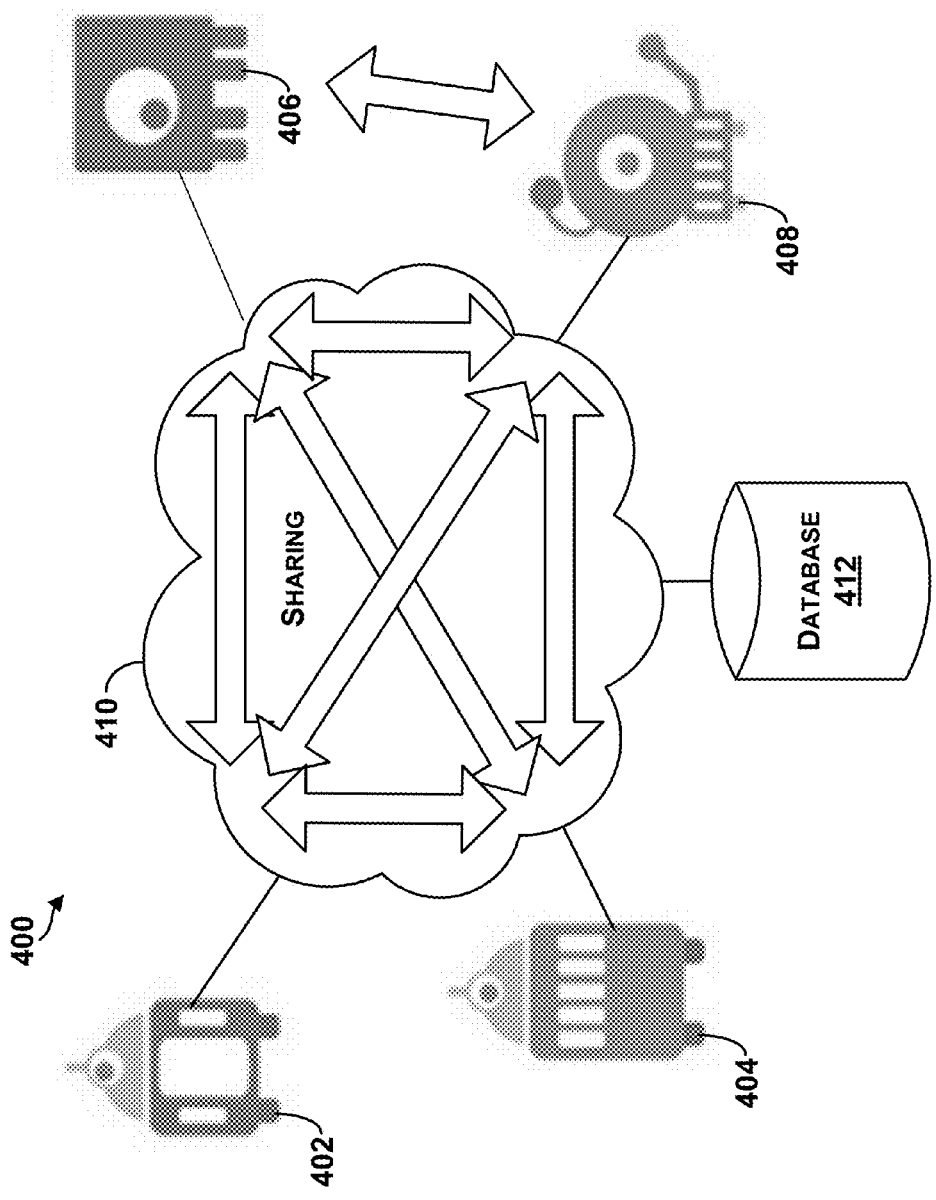
FIG. 4 is an example system in which robots may interact with the cloud and share information with other cloud computing devices.

FIG. 4 is an example system 400 in which robots may interact with the cloud and share information with other cloud computing devices. The system 400 illustrates robots 402, 404, 406, and 408 (e.g., as conceptual graphical representations) each coupled to a cloud 410. Each robot 402, 404, 406, and 408 may interact with the cloud 410, and may further interact with each other through the cloud 410, or through other access points and possibly directly (e.g., as shown between robots 406 and 408).

The cloud 410 may receive input from several robots. Data from each robot may be compiled into a larger data set. For example, the robot 402 may take a picture of a clothing object (image) and upload the image to the cloud 410. An object recognition program in the cloud 410 may be configured to identify the object in the image and provide data to all the robots connected to the cloud 410 about the recognized clothing, as well as possibly about other characteristics (e.g., metadata) of the recognized object, such as a location, size, weight, color. Thus, every robot may be able to know attributes of an object in an image uploaded by the robot 402.

The robots 402, 404, 406 and 408 may perform any number of actions with an area, people, or other robots. In one example, each robot 402, 404, 406 and 408 has WiFi or other network based connectivity and will upload/publish data to the cloud 410 that can then be shared with any other robot. In this manner, each robot 402, 404, 406 and 408 shares experiences with each other to enable learned behaviors. Robot 402 makes an assessment or determination based upon the observed object and/or user, which is then shared with the other robots 404, 406, and 408 (through the cloud 410). Each robot 402, 404, 406, and 408 will have access to real-time up to date data. One or more of these other robots may then proceed to perform some further function, such as picking up the object, and performing a task with the object. In another example, the robot 404 can download data indicating images seen by the other robots 402, 406, and 408 to help the robot 404 better identify an object using various views (e.g., in instances in which the robots 402, 406, and 408 have captured images of the objects from a different perspective).

In still another example, the robot 408 may build a map of an area, and the robot 402 can download the map to have knowledge of the area. Similarly, the robot 402 could update the map created by the robot 408 with new information about the area (e.g., the hallway now has boxes or other obstacles), or with new information collected from sensors that the robot 408 may not have had (e.g., the robot 402 may be an outdoor robot, and may record and add temperature data to the map if the robot 408 did not have a temperature sensor). Overall, the robots 402, 404, 406, and 408 may be configured to share data that is collected to enable faster adaptation, such that each robot 402, 404, 406, and 408 can build upon a learned experience of a previous robot.

Sharing and adaptation capabilities enable a variety of applications based on a variety of inputs/data received from the robots 402, 404, 406, and 408. In a specific example, data regarding a history of an output performed based upon some action taken by the robot (e.g., feedback on the action), can be provided to a new robot interacting with that type of situation or scenario in the future.

In one example, the cloud 410 may include, store, or provide access to a database 412 of information related to objects, and the database 412 may be accessible by all the robots 402, 404, 406, and 408. The database 412 may include information identifying objects that may be identical or similar, and details of the kinds of object e.g., mass, properties, shape, use, cost, any detail that may be associated with the object) that can be accessed by the robots 402, 404, 406, and 408 to perform object recognition and then interaction with the object.

The database 412 may be accessible by all robots through the cloud 410 (or alternatively directly accessible by all robots without communication through the cloud 410). The database 412 may thus be a shared knowledge-base stored in the cloud 410.

Thus, in some examples, robots may share new or learned behaviors through the cloud 410. The cloud 410 may have a server that stores robot learned activities or behaviors resulting in a shared knowledge-base of behaviors and heuristics for object interactions (e.g., a robot "app store"). Specifically, a given robot may perform actions and build a compendium related to an article of clothing, and then the robot can upload the data to the cloud 410 to share this knowledge with all other robots. In this example, a transportation of the given robot's "consciousness" can be made through the cloud 410 from one robot to another (e.g., robot "Bob" builds up a "map" of some clothing, and the knowledge of "Bob" can be downloaded onto another robot to receive knowledge of the "map").

Thus, within examples, the robots 402, 404, 406, and 408 may share information through the cloud 410, and may access the database 412.

4. Robot-Environment Interactions and Robot Behavior

As mentioned, robots (or any client computing device) may interact with the cloud and users to perform any number of functions. That includes attempting to respond to a situation or scenario where the robot has received potentially, or actually, conflicting commands which would otherwise call for simultaneous execution. In some examples, a method and system is described whereby the robot may autonomously resolve the conflict, as by concluding that one command can take precedence over the other, i.e., relaxing one or more constraints that would otherwise dictate the robot's response to a command. Example functions are described below.

Figure 5:
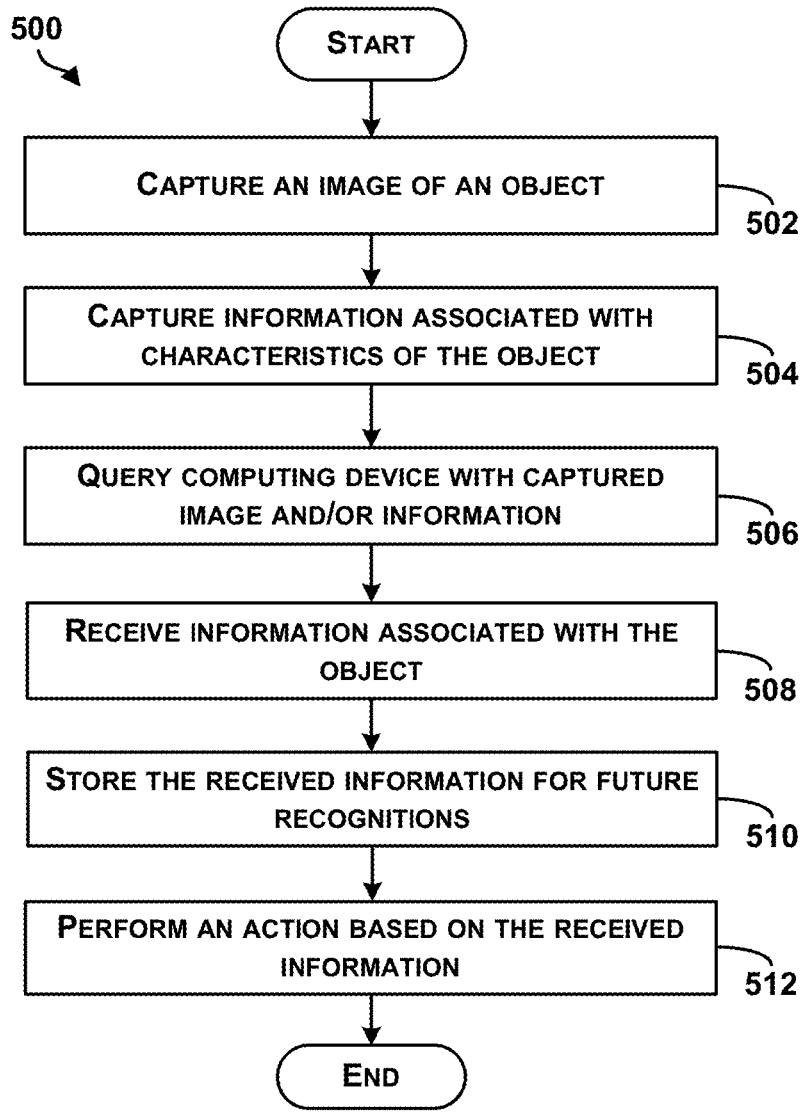
FIG. 5 is a block diagram of an example method of a robot object recognition capability.

FIG. 5 is a block diagram of an example method of a robot interaction with the cloud to facilitate general object recognition, in accordance with at least some embodiments described herein. Method 500 shown in FIG. 5 presents an embodiment of a method that, for example, could be used with the systems 100 and 400, for example, and may be performed by a device, such as another devices illustrated in FIGS. 1-4, or components of the device. While method 500 is related to object recognition, it is exemplary of how a robot would otherwise interact with the cloud to obtain relational, or other, information to a situation or circumstances presenting themselves to the robot. That would also include processing occurring in the cloud. That processing could be in conjunction with processing also occurring in part with the robot, or locally through another informational/computational resource.

Method 500 may include one or more operations, functions, or actions as illustrated by one or more of blocks 502-512. Although the blocks are illustrated in a sequential order, these blocks may also be performed in parallel, and/or in a different order than those described herein, unless dictated by a necessary earlier step. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

At block 502, the method 500 includes capture an image of an object. In an example, a robot may capture many images of objects using any number of sensors, such as a camera (still pictures or video feeds), infrared projectors, and other sensors as discussed herein.

At block 504, the method 500 includes capture information associated with characteristics about the object. For example, a robot may optionally determine or record dimensions, a texture, color, pattern, material, hardness, condition, or any type of physical attribute of the object.

As another example, in an instance in which the robot may communicate with the object, the robot may capture additional data of the object, such as by accessing a magnetic strip, RFID, near field communication clip, bar code, of the item. The robot may thereby communicate with the item to determine many types of data.

At block 506, the method 500 includes query a computing device with the captured image and/or information. As an example, the robot may query the cloud with a captured image by sending the captured image to the cloud and requesting information about the image, such as an identity of the image or information associated with characteristics of the object in the image. Alternatively, the robot may query another robot directly to request information about the object, such as an image of an alternate view of the object.

At block 508, the method 500 includes receiving information or retrieving information associated with the object. For example, the robot may receive data from the cloud indicating an identity of the object in the image, or other information related to or associated with characteristics about the object.

At block 510, the method 500 includes storing the received information for future recognitions. For example, after receiving the information from the cloud, the robot would be able to recognize the clothing in the future enabling the robot to learn and adapt. Storing is an optional step.

At block 512, the method 500 includes performing an action based on the received information. The action may vary based on a type of received information, or the query that is presented by the robot. As an example, the robot may query the cloud to identify the object and details of the object to enable the robot to interact with the object, as well as a potential user of the object.

Figure 6:
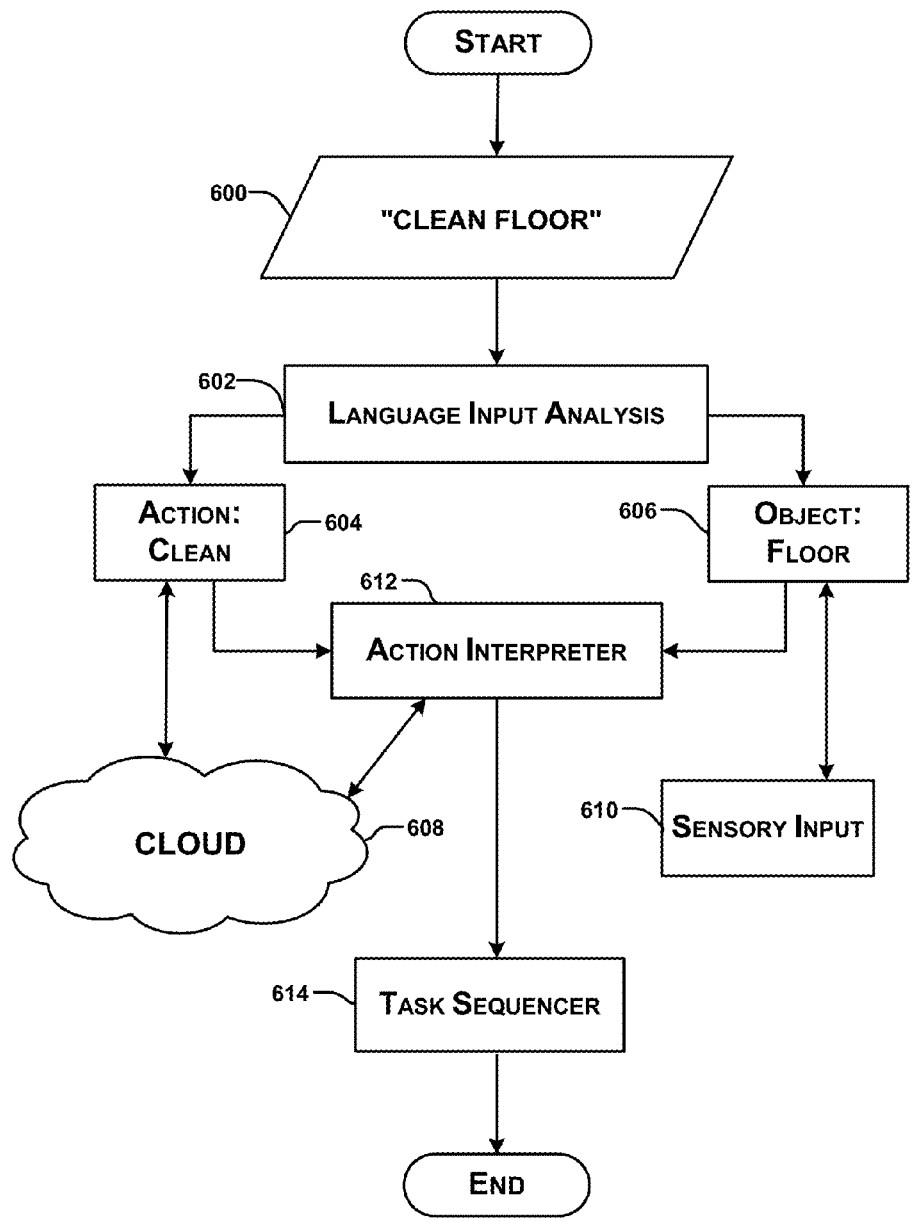
FIG. 6 is a block diagram of an example parsing method or breakdown sequence.

FIG. 6 illustrates an example flow diagram of interaction of a higher-level reasoning for a task and lower-level classification reasoning in executing a task. Higher level reasoning may be directed to an action forming part of a task command, e.g., a verb, and resolve a command or situation into a context. For instance, a command at block 600 may include to "clean floor." This is a command, or request, which is interpreted using language input analysis at block 602, resolving into a specific classification reference: task (verb) is "clean" (block 604), and the object/target of classification (noun) of the task is "floor" (block 606). Higher level reasoning in block 604 then involves obtaining relational information as to the pertinent task steps necessary to effect "cleaning." This may be a subroutine from past cleaning experiences, which may be resident in the robot's memory, or drawn from some other relational resource (which could be another robot, for instance), or obtained from the cloud, as shown in block 608.

In a similar manner, the lower level classification reasoning then involves obtaining relational information to the object classification of "floor." At block 610, this may include sensory input from the environment of the robot as to what "floor" is involved (i.e., using the object recognition method 500 of FIG. 5). This lower level classification may thus further include a determination of which of several "floors" may be actually specified or intended. Here again, environmental and user data may be accessed for the determination of which "floor;" for instance, the user may have just entered the vicinity of the robot from working in the garden outdoors, and deposited dirt on the adjacent floor. The robot may thus use this sensory input to conclude that the newly dirtied floor is intended to be the subject of "clean."

Once the lower level classification is determined (what "floor"), and relational information on "clean" has been determined, the command is then subject to analysis using an action interpreter, as at block 612. Action interpretation formulates the appropriate, or most likely, action to execute. This may include processing again using the cloud. A task sequencer program shown at block 614 could then be engaged to execute an output function for performing the task steps sequentially of cleaning the selected floor.

Figure 7:
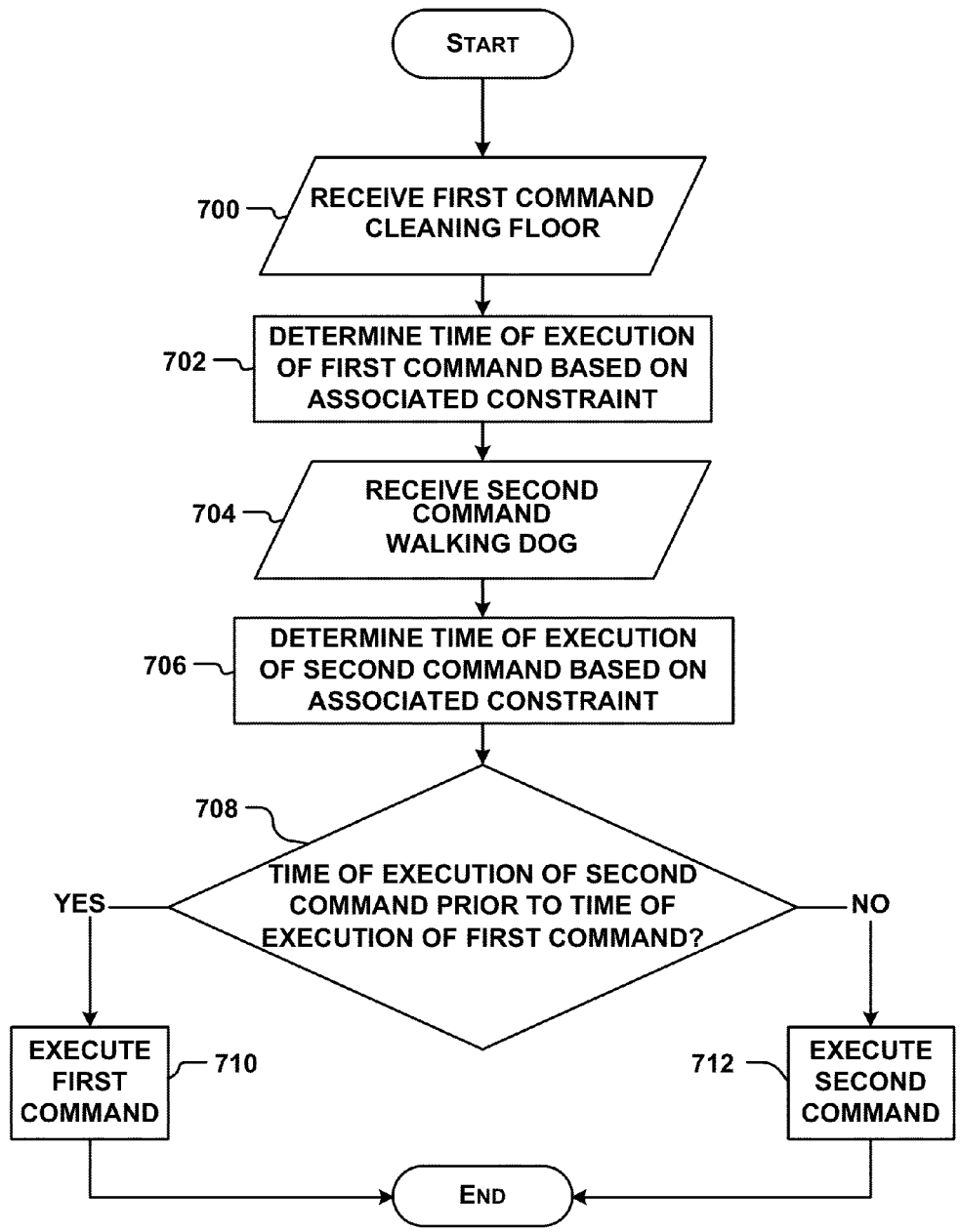
FIG. 7 is an example robotic system and method for resolving conflicting commands.

FIG. 7 illustrates in block fashion an example method where a robot receives commands that may be conflicting commands. In this example, the robot has been given a command as indicated at block 700 to "clean floor." The robot has also been given a command at block 704 of "walk dog." As with the discussion above involving "clean floor," the "walk dog" command has a higher level reasoning for determining "walk", and lower level classification reasoning for "dog."

Higher level reasoning then involves obtaining relational information as to the pertinent task steps necessary to effect "cleaning," including when to execute (block 700). This may be a subroutine from past "cleaning" experiences, which may be resident in the robot's memory, or drawn from some other relational resource (which could be another robot, for instance, a database, or the cloud). In a like manner, higher level reasoning involves obtaining relational information for pertinent task steps necessary for "walking," including when to execute (block 704). For instance, the robot may obtain electronic data from a user device as to where the "walking" is to take place, and when "walking" is typically effected.

In a similar manner, the lower level classification reasoning then involves obtaining relational information to the object classification of "dog." This may include sensory input from the environment of the robot as to what "dog" is involved (i.e., using the object recognition method 500 of FIG. 5).

The robot has now been given two conflicting commands, for example, the robot cannot execute an output function of cleaning the room while at the same time walking the dog. Identified constraints include, for instance, a time frame within which the floor must/should/can be cleaned (cleaning time frame), and a time frame within which the dog must/should/can be walked (walking time frame). A further constraint may be that there may be harm to the dog and/or the floor, if the dog is not walked within the walking time frame. Similarly, a further constraint may be that the floor may be harmed if the dirt is allowed to remain thereon, and get ground into the floor or stain the floor. Still further, constraints may include capabilities of the robot, such that the robot may not be able to perform certain tasks of a list of tasks to execute the command.

In some examples, the robot may determine which of the two, or more, potentially conflicting commands to execute, or to prioritize the execution of the two (or a plurality of commands) where prioritization is not provided in the command framework. More particularly, but without limitation, the robot may determine which commands of the two conflicting commands to perform, or determine to do none, using contextual/situational data obtained from the environment of the robotic apparatus, and/or a user, making the determination through processing in a cloud computing system.

Thus, the robot may access the informational resource, here the cloud (although it could be information resident in the robot memory, or in a local database), for relational information to the commands. For example the robot may determine a time of execution to clean the floor and a time of execution to walk the dog (blocks 702 and 706). Blocks 700, 702, 704, and 706 may be performed substantially simultaneously, or in sequential order as shown in FIG. 7.

Following, the robot may again access the cloud to determine when to execute each of the commands, as shown at block 708. That relational information may be on the nature of the dirt, foot traffic conditions, dwell time for staining, and a typically acceptable time frame within which "cleaning" takes place. That relational information may also be previous times when the dog has been walked, how long a walk takes, and what kind of latitude there may be in starting a walk sequence (i.e., can that be ten minutes, half an hour, an hour, of a usual walk time).

In this example, the robot determines that the current time of day is 10:00 a.m. A typical period for walking the dog does not occur until 11:00 a.m. The robot determines that the floor can be cleaned in less than an hour. The robot may then determine to relax the constraints on walking the dog, by suspending that command (block 710), while the robot then executes the floor cleaning output function. Floor cleaning has thus been prioritized over walking the dog.

Thus, the robot may determine the plurality of times of execution and compare with the conflict between a first constraint and a second constraint of a plurality of constraints. The robot may receive any number of commands, and each command may include a constraint (e.g., a first constraint associated with a first command of the plurality of commands (e.g., "clean the floor this morning"), and a second constraint associated with a second command of the plurality of commands (e.g., "be quiet in the presence of guests")). The robot then determines a first time of execution for the first command and a second time of execution for the second command (e.g., begin cleaning the floor now; cease movement now in view of guests in the room of the floor). The robot can be configured to further determine whether delaying execution of the first command resolves the conflict, and in response to determining that delaying execution of the first command resolves the conflict (suspend cleaning of the floor), changing the first time of execution (engage sensory devices over time to monitor whether guests remain in the room).

Modifying the foregoing example slightly, the robot may determine through sensory data that the dog has begun to whine, and scratch at the door to the yard outside. Again accessing an informational resource as at block 708, the robot determines that the dog is in distress as indicated by the dog's conduct. The robot therefore determines that the "walk dog" command, which might have been suspendible, should now be executed and the "clean floor" command can be suspended (block 712). The system and method of the foregoing embodiment may further provide for the methodology additionally including obtaining environmental sensory input data over time, and reevaluating whether the other of the first or said second output functions, which was suspended, may then be executed.

In some examples, the robot may assess a first benefit associated with performing a first command of the plurality of commands, and assess a second benefit associated with performing a second command of the plurality of commands. Based upon these assessments, the robot can then determine whether the second benefit exceeds the first benefit, and if so, set the time of execution for the first command to a suspended state. The foregoing method and system may further include obtaining sensory input data over time via at least one sensory device of the robotic system during the suspended state of the first command, and in response to the sensory input data, determining whether the first constraint is no longer in conflict, and if not, executing the first command.

In further examples, the system and method described herein may provide that any command that would result in an output function causing harm to a user is indefinitely suspended. Furthermore, any command that would result in an output function causing harm to the robotic device may be indefinitely suspended, unless harm would result to a user by suspension. This system and method may further provide executing a command that would cause the least harm to a user.

In other examples, the robotic device may be configured to determine which command of a number of commands to execute based on an environmental analysis and response capability. A robot includes a computer processor, memory and operating system, with at least one sensory device capturing data relating to environmental conditions in the vicinity of the robot, or a user, for an environmental input. An electronic data capture device can also be provided for the robot. That data capture may be concerning a user in the vicinity of the robot, to thereby obtain user data input. This user data input is then applied in the processing step to obtain information regarding a state of the user, or some other information regarding the user. Obtaining user data input may preferably include a first device associated with the robot obtaining user data from a second device, wherein the user data relates to communication between a user and the second device containing user data. The second device may be one or more of a personal computer, a mobile telephone, a tablet computer, and a landline telephone.

As indicated, in some examples, the methodology of the application may be a higher-level service (e.g., higher in a software stack), such that details and specifics for how to proceed may be performed by the cloud. As an example, using the object recognition application of FIG. 5, the robot may execute software to perform immediate function calls, such as OrientObject( ) which may return information associated with an object (e.g., placing it right-side up), or RotateObject( ) which may cause the robot to pick up the object and obtain further views/sensory inputs. These immediate functions could be done through local processing within the robot, or by enabling function calls and operation through the cloud, which may facilitate control and operation of the robot without having to control or tie-up more limited computational capacities of the robot, for example.

The actions or functions of the system and method of FIGS. 6 and 7 may be performed by the robot, a local computational resource, or the cloud (or components of the cloud) in a distributed manner.

It should be understood that arrangements described herein are for purposes of example only. As such, those skilled in the art will appreciate that other arrangements and other elements (e.g., machines, interfaces, functions, orders, and groupings of functions) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, performed by a robotic device, the method comprising:
   receiving, at the robotic device, a plurality of commands, wherein each respective command of the plurality of commands is associated with a respective time of execution;
   determining, for each of the plurality of commands, at least one constraint of a plurality of constraints for the robotic device;
   for each respective command, determining the respective time of execution based on a satisfaction of the at least one constraint of the plurality of constraints associated with the respective command;
   providing, to at least one computing device, the plurality of commands;
   receiving, from the at least one computing device, results of performed simulations of the plurality of commands;
   determining a prioritization of execution of the plurality of commands based on the respective times of execution, the results of the performed simulations, and an environment where the respective commands are to be executed; and
   executing, by the robotic device, at least one command of the plurality of commands based on the prioritization of execution.

2. The method of claim 1, wherein determining the plurality of constraints comprises determining an environment for performing the respective command.

3. The method of claim 1, further comprising:
   determining a conflict between a first constraint and a second constraint of the plurality of constraints, the first constraint associated with a first command of the plurality of commands and the second constraint associated with a second command of the plurality of commands;
   determining a first time of execution for the first command and a second time of execution for the second command;
   determining whether delaying execution of the first command resolves the conflict; and
   in response to determining that delaying execution of the first command resolves the conflict, changing the first time of execution.

4. The method of claim 3, wherein changing the first time of execution comprises setting the first time of execution to a suspended state.

5. The method of claim 3, further comprising:
   obtaining sensory input data via at least one sensory device of the robotic device; and
   in response to the sensory input data, determining the at least one constraint of the plurality of constraints for the robotic device for the respective command.

6. The method of claim 1, further comprising:
assessing a first benefit associated with performing a first command of the plurality of commands, and assessing a second benefit associated with performing a second command of the plurality of commands;
making a determination of whether the second benefit exceeds the first benefit; and
based on the determination, setting the time of execution for the first command to a suspended state.

7. The method of claim 1, further comprising:
determining a conflict between executing a first command of the plurality of commands and a second command of the plurality of commands; and
determining whether to suspend execution of the first command or the second command based on environmental sensory input data obtained from a sensory device of the robotic device.

8. The method of claim 7, further comprising:
determining whether delaying execution of the first command resolves the conflict; and
in response to determining that delaying execution of the first command resolves the conflict, changing a time of execution of the first command.

9. The method of claim 1, further comprising determining an order at which to execute the plurality of commands based on respective time of execution and constraints associated with each command of the plurality of commands.

10. The method of claim 9, further comprising determining the order at which to execute the plurality of commands based on an environment of the robotic device.

11. The method of claim 9, further comprising determining the order at which to execute the plurality of commands based on outcomes associated with suspending execution of the respective commands.

12. The method of claim 11, wherein determining the order at which to execute the plurality of commands based on the outcomes associated with suspending execution of the respective commands comprises receiving results of simulations of the respective commands.

13. A non-transitory computer readable medium having stored therein executable instructions that, when executed by a robotic device that includes at least one sensory device, causes the robotic device to perform functions comprising:
receiving, at the robotic device, a plurality of commands, wherein each respective command of the plurality of commands is associated with a respective time of execution;
determining, for each of the plurality of commands, at least one constraint of a plurality of constraints for the robotic device;
for each respective command, determining the respective time of execution based on a satisfaction of the at least one constraint of the plurality of constraints associated with the respective command;
providing, to at least one computing device, the plurality of commands;
receiving, from the at least one computing device, results of performed simulations of the plurality of commands;
determining an order at which to execute the plurality of commands based at least in part on the respective times of execution and the results of the performed simulations; and
executing, by the robotic device, at least one command of the plurality of commands based on the determined order at which to execute the plurality of commands.

14. The non-transitory computer readable medium of claim 13, wherein the functions further comprise:
determining a conflict between a first constraint and a second constraint of the plurality of constraints, the first constraint associated with a first command of the plurality of commands and the second constraint associated with a second command of the plurality of commands;
obtaining sensory input data via the at least one sensory device of the robotic device; and
in response to the sensory input data, selecting one of the first command or the second perform to perform.

15. The non-transitory computer readable medium of claim 13, wherein the functions further comprise:
determining an order at which to execute the plurality of commands based on the respective times of execution, constraints associated with each command of the plurality of commands, and outcomes associated with execution of the respective commands.

16. A robotic device comprising:
one or more processors;
at least one sensor coupled to the one or more processors and configured to capture data about an environment in a vicinity of the at least one sensor; and
memory including executable instructions stored thereon that, when executed by the one or more processors, cause the robotic device to perform functions comprising:
receiving, at the robotic device, a plurality of commands, wherein each respective command of the plurality of commands is associated with a respective time of execution;
determining, for each of the plurality of commands, at least one constraint of a plurality of constraints for the robotic device;
for each respective command, determining the respective time of execution based on a satisfaction of the at least one constraint of the plurality of constraints associated with the respective command;
providing, to at least one computing device, the plurality of commands;
receiving, from the at least one computing device, results of performed simulations of the plurality of commands;
determining an order at which to execute the plurality of commands based at least in part on the respective times of execution and the results of the performed simulations; and
executing, by the robotic device, at least one command of the plurality of commands based on the determined order at which to execute the plurality of commands.

17. The robotic device of claim 16, wherein determining, for each of the plurality of commands, the at least one constraint of the plurality of constraints for the robotic device comprises:
determining capabilities of the robotic device; and
based on the capabilities, determining whether the robotic device can perform the respective command.

18. The robotic device of claim 16, wherein the instructions are further executable by the one or more processors to perform functions comprising:
determining a conflict between a first constraint and a second constraint of the plurality of constraints, the first constraint associated with a first command of the plurality of commands and the second constraint associated with a second command of the plurality of commands;
obtaining sensory input data via the at least one sensory device of the robotic device; and
in response to the sensory input data, selecting one of the first command or the second command to perform.

19. The robotic device of claim 16, wherein the instructions are further executable by the one or more processors to perform functions comprising:

determining an order at which to execute the plurality of commands based on the respective times of execution, constraints associated with each respective command of the plurality of commands, and outcomes associated with execution of the respective commands.

* * * * *